(12) United States Patent
Luo

(10) Patent No.: US 11,236,835 B2
(45) Date of Patent: Feb. 1, 2022

(54) PLUG VALVE WITH ADJUSTABLE ACTUATION ACTUATION PHASES FOR CONTROLLING FLOW RATE BY MEANS OF PLUG AXIAL MOVEMENT

(71) Applicant: Can Luo, Kunming (CN)

(72) Inventor: Can Luo, Kunming (CN)

( * ) Notice: Subject to any disclaimer, the term of this patent is extended or adjusted under 35 U.S.C. 154(b) by 74 days.

(21) Appl. No.: 16/635,495

(22) PCT Filed: Aug. 7, 2018

(86) PCT No.: PCT/CN2018/099267
§ 371 (c)(1),
(2) Date: Jul. 28, 2020

(87) PCT Pub. No.: WO2019/029545
PCT Pub. Date: Feb. 14, 2019

(65) Prior Publication Data
US 2020/0370666 A1    Nov. 26, 2020

(30) Foreign Application Priority Data

Aug. 8, 2017    (CN) .......................... 201710669397.7

(51) Int. Cl.
*F16K 11/085*    (2006.01)
*F16K 31/04*    (2006.01)
*E21B 34/00*    (2006.01)

(52) U.S. Cl.
CPC ........ *F16K 11/0856* (2013.01); *F16K 31/043* (2013.01); *E21B 34/00* (2013.01)

(58) Field of Classification Search
CPC ... F16K 11/078; F16K 11/0856; F16K 31/043
(Continued)

(56) References Cited

U.S. PATENT DOCUMENTS 2,908,367 A * 10/1959 Sinclair ................... F16D 23/10
                                              192/69.3
3,237,648 A *  3/1966 Grisay ................ D03D 51/085
                                              139/1 E
(Continued)

FOREIGN PATENT DOCUMENTS

CN         2054106 U      3/1990
CN       201437851 U      4/2010
(Continued)

OTHER PUBLICATIONS

International Search Report (in English and Chinese) and Written Opinion issued in PCT/CN2018/099267, dated Oct. 16, 2018, total 9 pages provided.

*Primary Examiner* — Seth W. Mackay-Smith
(74) *Attorney, Agent, or Firm* — Hamre, Schumann, Mueller & Larson, P.C.

(57) ABSTRACT

A plug valve with adjustable actuation phases for controlling a flow rate by means of plug axial movement includes a power disk, a bearing, an inner spline, an outer spline, a valve stem, a pushing ring, a pushing fork, a plug body and a valve body. The plug body, the valve stem, the pushing ring and the outer spline are integrally formed, and are in spline connection with the power disk and the inner spline. The plug body has a special-shaped through hole in which a left portion thereof is narrow and a right portion thereof is wide. The valve body has a radial valve through hole, and the valve through hole corresponds to the plug special-shaped through hole provided at the same axial position segment, so that an actuating member for controlling actuation of a passageway is formed.

9 Claims, 2 Drawing Sheets

(58) Field of Classification Search
USPC .................................................. 137/625.47
See application file for complete search history.

(56) References Cited

U.S. PATENT DOCUMENTS

| | | | | |
|---|---|---|---|---|
| 3,269,412 A * | 8/1966 | Badke | ................... | F16K 11/078 137/625.17 |
| 4,854,348 A * | 8/1989 | Tochikubo | ............ | F16K 11/078 137/625.17 |
| 4,874,006 A * | 10/1989 | Iqbal | ..................... | F16K 11/078 137/119.05 |
| 5,275,195 A * | 1/1994 | Breda | ................... | F16K 11/078 137/100 |
| 5,482,081 A * | 1/1996 | Adams | ................... | F16K 11/078 137/597 |
| 5,954,093 A * | 9/1999 | Leonard | .............. | F15B 13/0406 137/625.23 |
| 6,594,992 B1 * | 7/2003 | Naito | ....................... | F15B 11/17 137/625.17 |
| 6,637,757 B2 * | 10/2003 | Ignatius | ............. | B60G 17/0185 280/124.106 |
| 7,165,570 B1 * | 1/2007 | Lordahl | ................ | F16K 11/078 137/454.6 |
| 8,887,754 B2 * | 11/2014 | Dahlke | ............... | F16K 99/0011 137/315.17 |
| 8,991,426 B2 * | 3/2015 | Elms | ....................... | F16K 11/07 137/625.47 |
| 9,316,237 B1 * | 4/2016 | Mullen | ............... | F15B 13/0406 |
| 9,347,571 B2 * | 5/2016 | Hoang | ................... | F16K 31/02 |
| 9,512,929 B2 * | 12/2016 | Folkner | ............. | F16K 11/0856 |
| 2004/0173510 A1 * | 9/2004 | Jung | .................... | B01D 29/668 210/108 |
| 2010/0071790 A1 * | 3/2010 | Hoang | ................ | F16K 11/0856 137/625.48 |
| 2014/0034168 A1 * | 2/2014 | Folkner | .................... | F04F 1/02 137/625.69 |
| 2014/0053932 A1 * | 2/2014 | Hoang | ................... | F16K 31/12 137/625.48 |

FOREIGN PATENT DOCUMENTS

| | | |
|---|---|---|
| CN | 201916517 U | 8/2011 |
| RU | 2179678 C2 | 2/2002 |
| WO | 2012112562 A2 | 8/2012 |

\* cited by examiner

PLUG VALVE WITH ADJUSTABLE ACTUATION ACTUATION PHASES FOR CONTROLLING FLOW RATE BY MEANS OF PLUG AXIAL MOVEMENT

TECHNICAL FIELD

The present invention relates to the technical field of plug valves, and particularly to a plug valve with a plug body having a special-shaped through hole, wherein the plug body may move rightward or leftward along an axial direction, is capable of adjusting actuation phases during uniform rotation, and is capable of controlling a flow rate of a fluid under a constant differential pressure of the fluid.

BACKGROUND

A plug valve is actuated by enabling a passageway port on a plug body to be communicated with or to be separated from a passageway port on a valve body. The plug valve is widely applied in oilfield exploitation, transportation and refinery equipment, and is broadly applied in the industry.

A plug valve is a valve which uses its plug body with a through hole as an actuating member. The plug body rotates along with the valve stem for actuation. Importantly, the plug valve easily adapts to a multi-passageway structure, and one valve may obtain one or more different passageways. Accordingly, the design of a piping system may be simplified, and the quantity of the valves and connection accessories may be reduced.

A conventional plug valve is composed of a valve body, a plug body and a manual handle with a valve stem. The plug body is of a cylindrical body with a radial through hole. The valve body is of a circular pipe with a radial through hole and is in close contact with the plug body. The manual handle reciprocally rotates within a range of 90 degrees. The plug body is driven by the valve stem to rotate to change a phase of the plug through hole. The plug through hole and the valve through hole constitute an actuating member. Reference is made to FIG. 8. The conventional plug valve has the disadvantage that during reciprocal rotation, a position of an opening point, a position of a closing point, and a phase of an opening travel cannot be changed.

An actuation process of the conventional plug valve refers to FIG. 9, which is a D-D sectional view showing a continuous change in plug phases. FIG. 9 sequentially shows a first phase 1, a second phase 2, a third phase 3, a fourth phase 4 and a fifth phase 5 from left to right. Starting from the first phase, namely, a valve fully-close point, the plug body rotates for 30 degrees clockwise to the second phase, namely, a valve opening point. The plug body rotates for 60 degrees clockwise to the third phase, namely, a valve fully-open point. Then, the plug body rotates for 60 degrees counterclockwise to the fourth phase, namely, a valve closing point. The plug body rotates for 30 degrees counterclockwise to become the fifth phase, namely, a valve fully-close point, which is the same as the first phase.

For the conventional plug valve, there are two methods to control and change a flow rate of a fluid through a valve. The first method is to change a rotation speed of the plug body in different periods within an actuating cycle, wherein prolonging an opening period of the plug body may allow more fluid to pass through. The second method is to change a differential pressure of the fluid, for example, a supercharging apparatus is disposed at the upstream of the fluid, so that a differential pressure between the upstream and the downstream of the fluid is increased, and more fluid may be allowed to pass through the valve within the same opening travel phase. The two methods are supported by a complicated variable-speed or variable-pressure device, which have limitations.

There is a need for a plug valve with a plug body having a special-shaped through hole, wherein the plug body may move rightward or leftward along an axial direction, is capable of adjusting actuation phases during uniform rotation, and is capable of controlling a flow rate of a fluid under a constant differential pressure of the fluid.

SUMMARY

An objective of the present invention is to provide a plug valve with a plug body having a special-shaped through hole, wherein the plug body may move rightward or leftward along an axial direction, is capable of adjusting actuation phases during uniform rotation, and is capable of controlling a flow rate of a fluid under a constant differential pressure of the fluid.

The plug valve with adjustable actuation phases for controlling a flow rate by means of plug axial movement includes a power disk, a bearing, an inner spline, an outer spline, a valve stem, a pushing ring, a pushing fork, a plug body and a valve body. The plug valve is characterized in that the plug body, the valve stem, the pushing ring and the outer spline are integrally formed, and are in spline connection with the power disk and the inner spline. The bearing is fixed with the valve body. The power disk and the inner spline can only rotate. The plug body, the valve stem, the pushing ring and the outer spline move rightward or leftward along an axial direction when rotating with the same phase with the power disk.

The power disk is a disc, is driven by a power source to rotate, is provided with a cylindrical body on the left side, is supported on the bearing, and is connected with the inner spline. The power disk rotates under the support of the bearing without moving along the axial direction.

The plug body is of a cylindrical body, and is provided with a special-shaped through hole along an axial direction. The plug special-shaped through hole is disposed along a radial direction of the plug body. The plug special-shaped through hole refers to that the through hole has different circumferential dimensions at different axial position segments, and is of a shape in which a left portion thereof is narrow and a right portion thereof is wide. The plug body is connected with the outer spline through the valve stem. The pushing ring is disposed on the valve stem. The pushing ring is positioned in a clamping slot of the pushing fork. The pushing ring and the pushing fork are disposed in a relatively low resistance manner. The pushing ring rotates in the clamping slot of the pushing fork. When the pushing fork moves rightward or leftward along the axial direction, the pushing ring, the valve stem, the plug body and the outer spline are driven to move rightward or leftward along the axial direction.

The spline connection is an existing mature mechanical connection, and the inner spline and the outer spline may move and slide oppositely along the axial direction at the same rotation speed. The valve stem is of a cylindrical body, the pushing ring is of a circular body, and the pushing ring is connected coaxially with the valve stem into a whole. The pushing fork is a U-shaped clamping slot, which moves left or right without rotating.

The valve body is of a tubular body, and the inner wall of the valve body is in close contact with the outer wall of the plug body. The valve body is provided with a plurality of groups of radial through holes, and each group of valve through holes corresponds to the plug special-shaped through holes at the same axial position segments, so that an actuating member for controlling actuation of a passageway is formed.

The present invention has two structures.

In the first structure of the present invention, a valve body is provided with six groups of twelve valve through holes sequentially along an axial direction, and each group includes two valve through holes, namely, an upper valve through hole and a lower valve through hole, which are opposite to each other along a radial direction. A plug body is provided with six plug special-shaped through holes from left to right, axial positions of which respectively correspond to those of the six groups of valve through holes. The six special-shaped through holes may be matched with the valve through holes to form six pairs of actuating members. When the valve is fully opened, the six plug special-shaped through holes of the plug body are mutually staggered and disposed according to actual requirements. Reference is made to FIG. 2.

In the first structure of the present invention, a power disk is driven by a power source to rotate under the support of a bearing, and an outer spline is driven by an inner spline to rotate. Therefore, the plug body, the valve stem, the pushing ring and the power disk rotate with the same phase. During the rotation, each actuating member formed by cooperation of each plug special-shaped through hole and each valve through hole has different phases of opening points, closing points and opening travels. When the plug body rotates, the pushing fork is controlled to move rightward or leftward along the axial direction, so as to drive the pushing ring, the valve stem and the plug body to move rightward or leftward. Axial position segments and circumferential dimensions of the six plug special-shaped through holes forming the actuating members in cooperation with the valve through holes change, and the phases of the opening points, closing points and opening travels of the six pairs of actuating members change. Accordingly, the phases are adjusted, and thus the flow rate of the fluid is adjusted. The first structure is used for controlling adjustable actuation phases of a plurality of passageways vertically communicated with each other along the radial direction. When the plug body rotates for one revolution, the six passageways communicated with each other along the radial direction are actuated twice.

A plug body position adjusting effect of a first pair of actuating members formed by a first left plug special-shaped through hole and a first left pair of valve through holes in FIG. 2 is taken as an example. Two phase adjusting effects of the phases of the opening points, closing points and opening travels formed by means of axial right movement or axial left movement of the pushing fork when the plug body is in uniform rotation refer to FIG. 3 and FIG. 5. A comparative description will be made below.

FIG. 3A-A is a sectional view showing a continuous change in plug phases, which schematically illustrates a continuous change of five plug phases, namely, a first phase 1, a second phase 2, a third phase 3, a fourth phase 4 and a fifth phase 5 sequentially from left to right. When the plug body is in uniform rotation, the pushing fork moves rightward. Starting from the first phase, namely, a valve fully-close point, the plug body clockwise rotates for 30 degrees to the second phase, namely, a valve opening point. The plug body clockwise rotates for 60 degrees to the third phase, namely, a valve fully-open point. Then, the plug body counterclockwise rotates for 60 degrees to the fourth phase, namely, a valve closing point. The plug body counterclockwise rotates for 30 degrees to the fifth phase, namely, a valve fully-close point, which is the same as the first phase. An opening travel phase of the valve is 120 degrees in total.

FIG. 5B-B is a sectional view showing a continuous change in plug phases, which schematically illustrates a continuous change in five plug phases, namely, a first phase 1, a second phase 2, a third phase 3, a fourth phase 4 and a fifth phase 5 sequentially from left to right. When the plug body is in uniform rotation, the pushing fork moves leftward. Starting from the first phase, namely, a valve fully-close point, the plug body clockwise rotates for 25 degrees to the second phase, namely, a valve opening point. The plug body clockwise rotates for 65 degrees to the third phase, namely, a valve fully-open point. Then, the plug body counterclockwise rotates for 65 degrees to the fourth phase, namely, a valve closing point. The plug body counterclockwise rotates for 25 degrees to the fifth phase, namely, a valve fully-close point, which is the same as the first phase. An opening travel phase of the valve is 130 degrees in total. Compared with the A-A sectional view showing the continuous change in the plug phases when the pushing fork moves rightward, the B-B sectional view showing the continuous change in the plug phases when the pushing fork moves leftward has the characteristics that the phase of the opening point is advanced by 5 degrees, the phase of the closing point is delayed by 5 degrees, and the phase of the opening travel is extended by 10 degrees in total. These are two phase adjusting effects of the first pair of actuating members.

When the pushing fork moves rightward or leftward along the axial direction, two phase adjusting effects of phases of opening points, closing points and opening travels of other five pairs of actuating members formed by the other five plug special-shaped through holes and the five groups of valve through holes are the same as those of the first pair of actuating members.

In the second structure of the present invention, the valve body is provided with three groups of six valve through holes at the left side, and the three groups of six valve through holes are evenly disposed at the same axial position along a circumferential direction. A fluid supplying chamber with a 360-degree hollow annular groove in the inner side is disposed on the right side of the valve body. A normally-open fluid inlet is provided to allow a sufficient amount of a fluid to flow into the fluid supplying chamber at any time. The plug body is of a cylindrical body with a central hollow pipe, and the plug body is provided with one group of two radially-opposite plug through holes at the left side, and the one group of two radially-opposite plug through holes may be matched with the valve through holes to form a pair of porous actuating members. The plug body is provided with one group of two radially-opposite plug square through holes at the right side, and the one group of two radially-opposite plug square through holes may form a normally-open passageway together with the fluid supplying chamber to allow a sufficient amount of the fluid to flow into the plug central hollow pipe at any time. Reference is made to FIG. 4.

In the second structure of the present invention, a power disk is driven by a power source to rotate under the support of a bearing, and an outer spline is driven by an inner spline to rotate. Therefore, the plug body, the valve stem, the pushing ring and the power disk rotate with the same phase. During the rotation, each actuating member formed by cooperation of each plug special-shaped through hole and each valve through hole has different phases of opening points, closing points and opening travels during actuation of each valve through hole.

Similar to the first structure, when the plug body of the second structure of the present invention rotates, the pushing fork is controlled to move rightward or leftward along the axial direction, so as to drive the pushing ring, the valve stein and the plug body in rotation to move rightward or leftward. Axial position segments and circumferential dimensions of the two plug special-shaped through holes forming the actuating members in cooperation with the six valve through holes change, and the phases of the opening points, closing points and opening travels of the six valve through holes change. Accordingly, the phases are adjusted, and thus the flow rate of the fluid is adjusted. The second structure is used for controlling adjustable actuation phases while transporting the fluid at different periods from a main passageway to six branch passageways. The main passageway includes a fluid a fluid supplying chamber, a plug square through hole and a plug central hollow pipe, and the six branch passageways include six valve through holes. The plug body rotates for one revolution, and the six valve through holes are actuated twice.

The plug body with the special-shaped through hole is employed in the present invention. By controlling the pushing fork to move rightward or leftward along the axial direction, the plug special-shaped through hole is driven to move rightward or leftward along the axial direction. When the plug body is in uniform rotation, the actuation phase may be adjusted, and the flow rate of the fluid may be adjusted under constant differential pressure of the fluid.

BRIEF DESCRIPTION OF THE DRAWINGS

In FIG. 1, FIG. 2, FIG. 4, FIG. 6, FIG. 7 and FIG. 8, 1 represents a power disk (1 represents a manual handle in FIG. 1); 2 a bearing; 3 an inner spline; 4 an outer spline; 5 a valve stem; 6 a pushing ring; 7a pushing fork; 8 a plug body; 9 a plug special-shaped through hole; 10 a valve body; 11 a valve through hole; 12 a plug central hollow pipe; 13 a fluid inlet; 14 a fluid supplying chamber; and 15 a plug square through hole.

In FIG. 3, FIG. 5 and FIG. 9, 1 represents a first phase; 2 a second phase; 3 a third phase; 4 a fourth phase; and 5 a fifth phase. Each plug valve in each drawing is horizontally disposed, the valve body and the plug body are disposed on the left side, and the power disk is disposed on the right side. In actual use, the plug valve may be horizontally or obliquely disposed as required.

DETAILED DESCRIPTION

Figure 1:
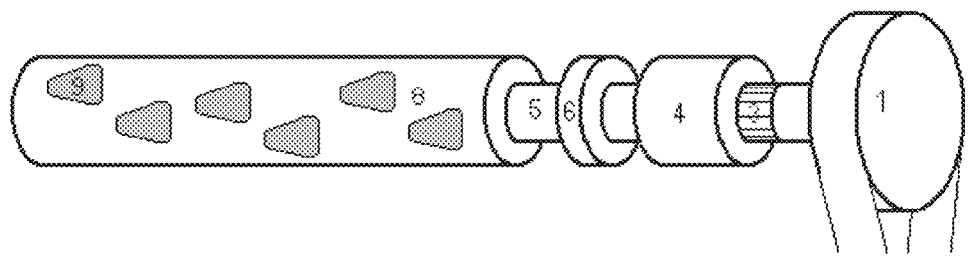
FIG. 1 is a schematic perspective view of a first structure without a valve body, a pushing fork and a bearing according to the present invention.

The present invention will be further described below with reference to accommodating drawings and specific embodiments.

A first embodiment: a first structure of a plug valve with adjustable actuation phases for controlling a flow rate by means of plug axial movement according to the present invention serves as an intake valve and an exhaust valve of an in-line three-cylinder piston engine.

A first structure of the plug valve with adjustable actuation phases for controlling a flow rate by means of plug axial movement includes a power disk 1, a bearing 2, an inner spline 3, an outer spline 4, a valve stem 5, a pushing ring 6, a pushing fork 7, a plug body 8 and a valve body 10.

The power disk 1 is a disc, is provided with a cylindrical body on the left side of the power disk 1, is supported on the bearing 2, and is connected with the inner spline 3. The power disk 1 rotates under the support of the bearing 2 without moving along the axial direction. The plug body 8 is of a cylindrical body, and is provided with six plug special-shaped through holes 9 along the axial direction. The plug special-shaped through holes refer to that the through holes have different circumferential dimensions in different axial position segments, that is, dimensions of the through holes change along the axial direction. The plug body 8 is connected with the outer spline 4 through the valve stem 5. The pushing ring 6 is disposed on the valve stem 5. The pushing ring 6 is positioned in a clamping slot of the pushing fork 7. The pushing ring 6 and the pushing fork 7 are disposed in a relatively low resistance manner. The pushing ring 6 rotates in the clamping slot of the pushing fork 7. When the pushing fork 7 moves rightward or leftward along the axial direction, the pushing ring 6, the valve stem 5, the plug body 8 and the outer spline 4 are driven to move rightward or leftward along the axial direction. (Usually, a combination of the pushing fork and the pushing ring is replaced with a combination of a pushing rod and a pushing groove, but their functions are identical.) The inner spline 3 and the outer spline 4 may move and slide oppositely along the axial direction at the same rotation speed. The valve stem 5 is of a cylindrical body, and the pushing ring 6 is of a circular body and is coaxially connected with the valve stem 5 into a whole. The pushing fork 7 is a U-shaped clamping slot, which moves left or right without rotating. The valve body 10 is of a tubular body, and the inner wall of the valve body 10 is in close contact with the outer wall of the plug body 8. The valve body 10 is provided with six groups of twelve radial through holes 11, and each group of valve through holes 11 corresponds to the plug special-shaped through hole 9 at the same axial position segment, so that an actuating member for controlling actuation of a passageway is formed.

The valve body 10 is provided with six groups of twelve valve through holes 11 sequentially along the axial direction, and each group includes two valve through holes, namely, an upper valve through hole and a lower valve through hole, which are opposite to each other in a radial direction. The plug body 8 is provided with six plug special-shaped through holes 9 from left to right, axial positions of which respectively correspond to those of the six groups of valve through holes 11. The six plug special-shaped through holes 9 may be matched with the valve through holes 11 to form six pairs of actuating members. When the valve is fully opened, the six plug special-shaped through holes 9 are mutually staggered and disposed along a circumferential direction according to actual requirements. In this embodiment, intake valves and exhaust valves of individual cylinders of the three-cylinder engine are mutually staggered and disposed along a circumferential direction according to requirements of their actuations.

The plug valve of the first embodiment is disposed in a cylinder cover of the in-line three-cylinder engine, so that a rotation axis of the plug body 8 is parallel to an alignment line of the in-line three cylinders of the engine, and the valve body 10 and the bearing 2 are fixedly connected with the cylinder cover of the engine. Among the six groups of valve through holes 11, the first group of through holes, the third group of through holes and the fifth group of through holes from the left are disposed in intake pipelines of three cylinders as intake valves of the first cylinder, the second cylinder and the third cylinder, and the second group of through holes, the fourth group of through holes and the sixth group of through holes from the left are disposed in exhaust pipelines of the three cylinders as exhaust valves of the first cylinder, the second cylinder and the third cylinder. When the engine operates, phases of individual plug special-shaped through holes 9 along the circumferential direction when the plug through holes 9 are fully opened are set according to a working order of the individual cylinders and according to fully-open phases required by the intake valves and the exhaust valves of the individual cylinders, so that the corresponding plug special-shaped through hole 9 when there is a need for opening the intake valve and the exhaust valve of each cylinder is in an opened phase in cooperation with the valve through hole 11, and the corresponding plug special-shaped through hole 9 when there is a need for closing the intake valve and the exhaust valve of each cylinder is in a closed phase in cooperation with the valve through hole 11. Circumferential dimensions of the plug special-shaped through holes 9 at individual axial position segments are set according to requirements for adjusting the phases of the opening points, closing points and opening travels when the engine operates, that is, a shape with one large end and one small end of the special-shaped through hole is set according to requirements for adjusting the intake valve and the exhaust valve, so that the special-shaped through hole has a shape corresponding to a phase adjusting change required by the intake valve and the exhaust valve. The pushing fork 7 is controlled by a control system to move rightward or leftward along the axial direction. The power disk 1 is connected with a crankshaft timing wheel through a timing belt, so that every time the crankshaft rotates for four revolutions, the power disk 1 rotates for one revolution, the plug body 8 rotates for one revolution with the same phase, and each intake valve and each exhaust valve are actuated twice.

When the engine of the first embodiment operates, the power disk 1 is driven by a camshaft to rotate in a belt transmission manner under the support of a bearing 2. The plug body 8, the valve stem 5, the pushing ring 6 and the power disk 1 rotate with the same phase. When the plug body 8 rotates, the pushing fork 7 is controlled to move rightward or leftward along the axial direction, so as to drive the pushing ring 6, the valve stem 5 and the plug body 8 in rotation to move rightward or leftward. Axial position segments and circumferential dimensions of the six plug special-shaped through holes 9 forming the actuating members in cooperation with the valve through holes 11 change, and the phases of the opening points, closing points and opening travels of the six pairs of actuating members change. Accordingly, the phases are adjusted, and thus the flow rate of the fluid is adjusted. That is, in the first embodiment, actuation phases and intake or exhaust flow rates of the intake valves and the exhaust valves of individual cylinders are adjusted.

Figure 2:
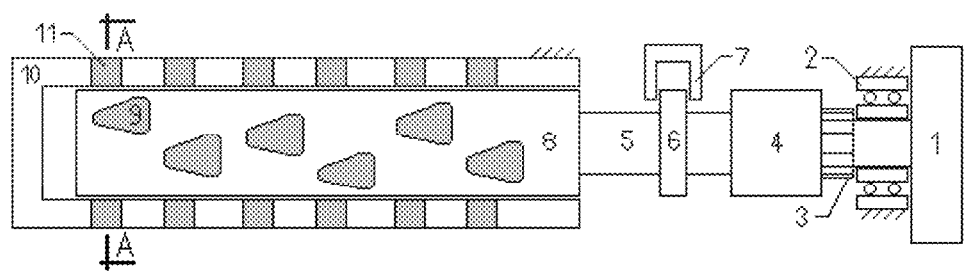
FIG. 2 is a sectional view of a vertical surface of a first structure in the axial direction when a pushing fork moves rightward according to the present invention.
Figure 3:
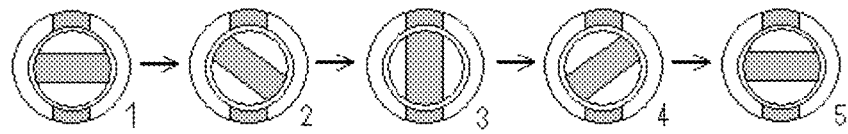
FIG. 3 is an A-A sectional view showing continuous changes in plug phases.
Figure 4:
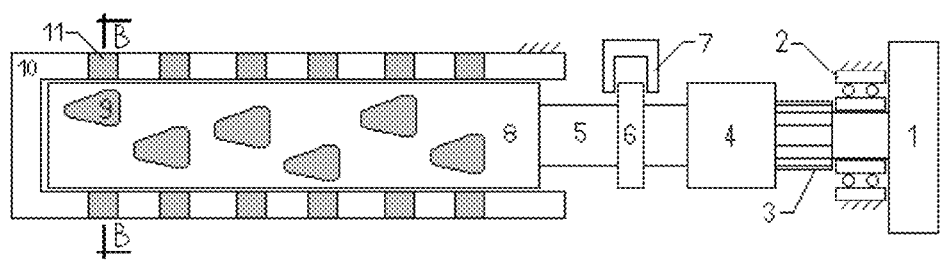
FIG. 4 is a sectional view of a vertical surface of a first structure in the axial direction when a pushing fork moves leftward according to the present invention.
Figure 5:
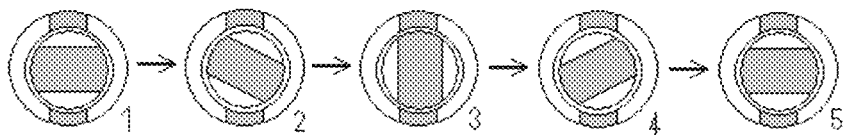
FIG. 5 is a B-B sectional view showing continuous changes in plug phases.
Figure 6:
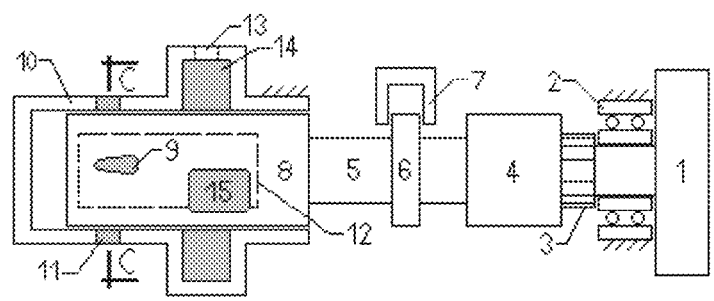
FIG. 6 is a sectional view of a vertical surface of a second structure in the axial direction when a pushing fork moves rightward according to the present invention.
Figure 7:
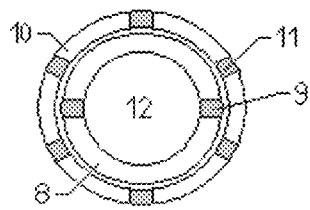
FIG. 7 is a C-C sectional view.
Figure 8:
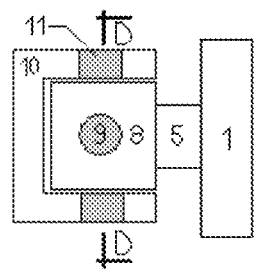
FIG. 8 is sectional view of a vertical surface of a conventional plug valve in the axial direction.
Figure 9:
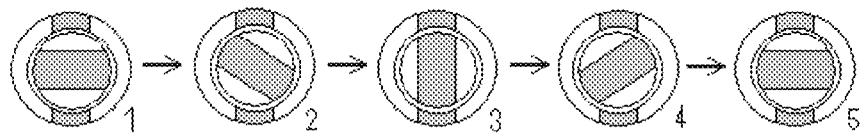
FIG. 9 is a D-D sectional view showing continuous changes in plug phases.

By moving the pushing fork 7 right to drive the plug body 8 to move rightward, through holes with relatively smaller circumferential dimensions at the left side of each of the plug special-shaped through holes 9 are matched with the corresponding valve through holes 11, so that the phases of the opening points of the first intake valve, the third intake valve and the fifth intake valve are relatively delayed, the phases of the closing points thereof are relatively advanced, and phases of opening travels thereof are relatively shortened; and the phases of the opening points of exhaust valves of the second exhaust valve, the fourth exhaust valve and the sixth exhaust valve are relatively delayed, the phases of the closing points thereof are relatively advanced, and the phases of the opening travels thereof are relatively shortened. Such a phase adjusting change in intake and exhaust of the engine brings the benefits for the engine to develop the low-speed and high-torque performance. Reference is made to FIG. 2. By moving the pushing fork 7 leftward to drive the plug body 8 to move leftward, through holes with relatively larger circumferential dimensions at the right side of each of the plug special-shaped through holes 9 are matched with the corresponding valve through holes 11, so that the phases of the opening points of the first intake valve, the third intake valve and the fifth intake valve are relatively advanced, the phases of the closing points thereof are relatively delayed, and the phases of the opening travels thereof are relatively extended; and the phases of the opening points of exhaust valves of the second exhaust valve, the fourth exhaust valve and the sixth exhaust valve are relatively advanced, the phases of the closing points thereof are relatively delayed, and the phases of the opening travels thereof are relatively extended. Such a phase adjusting change in intake and exhaust of the engine brings the benefits for the engine to develop the high-speed and high-power performance. Reference is made to FIG. 4.

The first structure of the plug valve with adjustable actuation phases for controlling a flow rate by means of plug axial movement of the present invention is suitable for engines with different numbers of cylinders as intake valves and exhaust valves of the engine. Compared with an intake valve and an exhaust valve of a conventional camshaft ejector type, the plug valve is simple in structure, low in self weight and low in energy consumption. When the engine operates, such an intake valve and an exhaust valve of the first embodiment easily adjust actuation phases of the intake valve and the exhaust valve and adjust intake or exhaust flow rates by controlling the pushing fork to move rightward or leftward along the axial direction, and are equivalent to a variable-timing and variable-opening travel valve system of an existing engine.

A second embodiment: a second structure of a plug valve with adjustable actuation phases for controlling a flow rate by means of plug axial movement according to the present invention serves as a valve for distributing a flow rate from a main passageway to six branch passageways.

The second structure of the plug valve with adjustable actuation phases for controlling a flow rate by means of plug axial movement includes a power disk 1, a bearing 2, an inner spline 3, an outer spline 4, a valve stem 5, a pushing ring 6, a pushing fork 7, a plug body 8 and a valve body 10.

The power disk 1 is a disc, is provided with a cylindrical body on the left side, is supported on the bearing 2, and is connected with the inner spline 3. The power disk 1 rotates under the support of the bearing 2 without moving along the axial direction. The plug body 8 is of a cylindrical body, and is provided with one group of two special-shaped through holes 9 along the axial direction. The special-shaped through holes refer to that the through holes have different circumferential dimensions in different axial position segments, that is, dimensions of the through holes change along the axial direction. The plug body 8 is connected with the outer spline 4 through the valve stem 5. The pushing ring 6 is disposed on the valve stem 5. The pushing ring 6 is positioned in a clamping slot of the pushing fork 7. The pushing ring 6 and the pushing fork 7 are disposed in a relatively low resistance manner. The pushing ring 6 rotates in the clamping slot of the pushing fork 7. When the pushing fork 7 moves rightward or leftward along the axial direction, the pushing ring 6, the valve stem 5, the plug body 8 and the outer spline 4 are driven to move rightward or leftward along the axial direction. (Usually, a combination of the pushing fork and the pushing ring is replaced with a combination of a pushing rod and a pushing groove, but their functions are identical.) The inner spline 3 and the outer spline 4 may move and slide oppositely along the axial direction at the same rotation speed. The valve stem 5 is of a cylindrical body, and the pushing ring 6 is of a circular body and is connected coaxially with the valve stem 5 into a whole. The pushing fork 7 is a U-shaped clamping slot, which moves left or right without rotating. The valve body 10 is of a tubular body, and the inner wall of the valve body 10 is in close contact with the outer wall of the plug body 8. The valve body 10 is provided with three groups of six valve through holes 11 at the left side. The three groups of six valve through holes 11 are evenly disposed in the same axial position of the valve body 10 along a circumferential direction. A fluid supplying chamber 14 with a 360-degree hollow annular groove in the inner side is disposed on the right side of the valve body 10. A normally-open fluid inlet 13 is provided to allow a sufficient amount of the fluid to flow into the fluid supplying chamber 14 at any time. The plug body 8 is of a cylindrical body with a central hollow pipe, and is provided with one group of two radially-opposite plug through holes 8 at the left side. The one group of two radially-opposite plug through holes 8 may be matched with the valve through holes 11 to form a pair of porous actuating members. The plug body 8 is provided with one group of two radially-opposite square through holes 15 at the right side. The one group of two radially-opposite square through holes 15 may form a normally-open passageway together with the fluid supplying chamber 14 to allow a sufficient amount of the fluid to flow into the central hollow pipe 12 of the plug body at any time.

The power disk 1 of the second structure of the present invention is driven by a power source to rotate under the support of a bearing 2, and the outer spline 4 is driven by the inner spline 3 to rotate. Therefore, the plug body 8, the valve stem 5, the pushing ring 6 and the power disk 1 rotate with the same phase. During the rotation, each actuating member formed by cooperation of each plug through hole 9 and each valve through hole 11 has different phases of opening points, closing points and opening travels during actuation of each valve through hole 11.

When the plug body 8 rotates, the pushing fork 7 is controlled to move rightward or leftward along the axial direction, so as to drive the pushing ring 6, the valve stem 5 and the plug body 8 in rotation to move rightward or leftward. Axial position segments and circumferential dimensions of the two plug special-shaped through holes 9 forming the actuating members in cooperation with the six valve through holes 11 change, and the phases of the opening points, closing points and opening travels of the six valve through holes 11 change. Accordingly, the phases are adjusted, and thus the flow rate of the fluid is adjusted. The second embodiment is applied to a valve for distributing a flow rate from a main passageway to six branch passageways with adjustable actuation phases for controlling the flow rate. When other numbers of valve through holes 11 are provided, the flow rate is distributed to other numbers of branch passageways. Other numbers of plug special-shaped through holes 9 may be provided as required.

The plug body 8 with the special-shaped through hole 9 is employed in the second embodiment. By controlling the pushing fork 7 to move rightward or leftward along the axial direction, the plug special-shaped through hole 9 is driven to move rightward or leftward along the axial direction. When the plug body 8 is in uniform rotation, the actuation phase of each actuating member may be adjusted, and the flow rate of the fluid in each branch passageway may be adjusted under constant differential pressure of the fluid.

The foregoing is illustrative of the basic principles, the main features and the advantages of the present invention. Those skilled in the art should understand that the present invention is not limited by the foregoing embodiments. What is described in the above embodiments and the description merely illustrates the principles of the present invention. Such changes and improvements fall within the claimed scope of the present invention. The claimed scope of the present invention is defined by the appended claims and their equivalents.

The invention claimed is:

1. A plug valve with adjustable actuation phases for controlling a flow rate by means of plug axial movement, comprising:
   a power disk, wherein one end of the power disk is matched with an outer spline by an inner spline, the outer spline is connected to a plug body by a valve stem,
   a bearing that supports the power disk during rotation of the power disk,
   a pushing ring is disposed on the valve stem, the pushing ring is clamped in a clamping groove of a pushing fork; when moving along the axial direction, the pushing fork drives the outer spline, the valve stem, the pushing ring and the plug body to move along the axial direction;
   the plug body is matched with a valve body and rotates within the valve body, the plug body is provided with a plug special-shaped through hole thereon, the plug special-shaped through hole is provided radially through the plug body, the valve body is provided with a valve through hole thereon, the valve through holes are provided in pairs in each group and radially passes through the valve body; and
   the plug special-shaped through hole is of a shape in which a left portion thereof is narrow and a right portion thereof is wide.

2. The plug valve with adjustable actuation phases for controlling a flow rate by means of plug axial movement according to claim 1, wherein the power disk rotates when driven by a driving apparatus, the power disk comprises a cylindrical body on a left side of the power disk and is connected with the inner spline at the left side of the power disk.

3. The plug valve with adjustable actuation phases for controlling a flow rate by means of plug axial movement according to claim 1, wherein the valve stem includes a cylindrical body, the pushing ring includes a circular body and is connected coaxially with the valve stem, and the pushing fork includes U-shaped clamping slot.

4. The plug valve with adjustable actuation phases for controlling a flow rate by means of plug axial movement according to claim 1, wherein the plug body includes a cylindrical body which is matched with a tubular body of the valve body for actuation.

5. The plug valve with adjustable actuation phases for controlling a flow rate by means of plug axial movement according to claim 1, wherein twelve valve through holes in six groups are disposed along the axial direction of the valve body, and each group of the valve through holes corresponds to one plug special-shaped through hole, six plug special-shaped through holes are disposed along the axial direction of the plug body, and phases of the six plug special-shaped through holes are staggered along a circumferential direction.

6. The plug valve with adjustable actuation phases for controlling a flow rate by means of plug axial movement according to claim 5, wherein the each group of valve through holes is aligned with each plug special-shaped through hole in an axial position.

7. The plug valve with adjustable actuation phases for controlling a flow rate by means of plug axial movement according to claim 1, wherein six valve through holes in three groups are disposed along the circumference of the valve body and radially pass through the valve body, and two plug special-shaped through holes in one group are provided and correspond to the valve through holes in axial positions.

8. The plug valve with adjustable actuation phases for controlling a flow rate by means of plug axial movement according to claim 7, wherein a central hollow pipe is disposed within the plug body and communicated with the plug special-shaped through holes, the central hollow pipe is provided with one group of two radially-penetrating plug square through holes in a right end, the plug special-shaped through hole and the plug square through holes are disposed along the axial direction from left to right, annular grooves are provided in axial positions corresponding to the plug square through holes on the valve body, the annular grooves are provided with an annular fluid supplying chamber, and the annular fluid supplying chamber is communicated with an outside through fluid inlets in the annular grooves.

9. The plug valve with adjustable actuation phases for controlling a flow rate by means of plug axial movement according to claim 7, wherein the six valve through holes in three groups are evenly distributed on the circumference of the valve body in the same axial position.

* * * * *